United States Patent [19]
Watanabe et al.

[11] 3,882,006

[45] May 6, 1975

[54] METHOD FOR CURING ALKYD RESIN COMPOSITIONS BY APPLYING IONIZING RADIATION

[75] Inventors: Tadashi Watanabe; Koichiro Murata; Tsutomu Maruyama, all of Hiratsuka, Japan

[73] Assignee: Kansai Paint Co., Ltd.

[22] Filed: Nov. 5, 1973

[21] Appl. No.: 412,977

Related U.S. Application Data

[63] Continuation of Ser. No. 91,204, Nov. 19, 1970, abandoned.

[30] Foreign Application Priority Data
Nov. 27, 1969 Japan .............................. 44-94679

[52] U.S. Cl. ... 204/159.15; 117/93.31; 117/126 GB; 204/159.19; 260/22 LB; 260/22 R; 260/861; 260/863
[51] Int. Cl. ............................ B01j 1/10; B01j 1/12
[58] Field of Search .................. 204/159.15, 159.19; 260/22 LB, 22 R

[56] References Cited
UNITED STATES PATENTS

| | | | |
|---|---|---|---|
| 3,350,335 | 10/1967 | Silver | 260/22 LB |
| 3,437,512 | 4/1969 | Burlant et al. | 204/159.15 |
| 3,542,587 | 11/1970 | Aronoff et al. | 204/159.15 |

*Primary Examiner*—Paul Lieberman
*Assistant Examiner*—Richard B. Turer
*Attorney, Agent, or Firm*—Ostrolenk, Faber, Gerb & Soffen

[57] ABSTRACT

An alkyd resin composition is prepared by dissolving a polymerizable alkyd resin having from 10 to 50% of oil length into a vinyl monomer. The polymerizable alkyd resin is obtained by a half-esterification reaction of an acid anhydride having a polymerizable unsaturated group and an alkyd resin modified with conjugated unsaturated fatty acid and/or conjugated unsaturated oil having at least one reactive hydroxyl group per one molecule. The alkyd resin composition thus obtained is coated on an article, and ionizing radiation is applied on the article to cure the coated film thereon.

7 Claims, No Drawings

METHOD FOR CURING ALKYD RESIN COMPOSITIONS BY APPLYING IONIZING RADIATION

This is a continuation of application Ser. No. 91,204 filed on Nov. 19, 1970, now abandoned.

This invention relates to the method for curing alkyd resin compositions by applying ionizing radiation and more particularly to the method for curing alkyd resin compositions consisting of the alkyd resin modified by conjugated unsaturated fatty acid and/or conjugated unsaturated oil, and a vinyl monomer by applying ionizing radiation, said alkyd resin obtained by half-esterification reaction of the alkyd resin having reactive hydroxyl groups in the structure and an acid anhydride having a polymerizable unsaturated group.

Heretofore, there have not been alkyd resins curable by applying ionizing radiation, but there are compositions comprising an unsaturated polyester and vinyl monomer which are curable by applying ionizing radiation. Unsaturated polyester resins are generally suitable for curing by the ionizing radiation, and since the curing reaction of the unsaturated polyester resin is generally based on a mechanism of radical polymerization, the influence due to oxygen in air is very remarkable. There is a disadvantage in that the resin is cured insufficiently in the surface of the coated film of the resin. Therefore, in the case of applying the unsaturated polyester resin compositions, wax-type substances must be added to the compositions. As a result, it is necessary to obtain the same degree of dry surface similar to that of other conventional coatings by sanding and polishing the surface of the coated film. The adhesion and flexibility of the dry film obtained from the unsaturated polyester resin composition are poor.

Accordingly, it is the general object of this invention to eliminate the above mentioned disadvantages.

It is a more particular object of this invention to provide the method for curing novel alkyd resin compositions by applying ionizing radiation, and the hardening property of the said alkyd resin compositions is excellent. Moreover, the adhesion and flexibility of a film cured by applying ionizing radiation are excellent.

It is another object of the present invention to provide a method suitable for curing the alkyd resin compositions adopted in coil coating or coating for woodworks by applying ionizing radiation.

A further object of the present invention is to provide a method for curing the alkyd resin compositions by ionizing radiation effective for the reduction of a required floor area for working, and high-speed coating line.

The nature, details, and utility of the invention will be more clearly apparent from the following detailed description beginning with general considerations and concluding with specific examples of practice constituting preferred embodiments of the invention and with other examples for comparison.

We have now discovered that above objectives can be attained by incorporating into the method for curing by applying ionizing radiation alkyd resin compositions consisting of an alkyd resin modified with conjugated unsaturated fatty acid and/or conjugated unsaturated oil and a vinyl monomer, said alkyd resin obtained by half-esterification reaction of an alkyd resin having the reactive hydroxyl groups in the structure and an acid anhydride having a polymerizable unsaturated group.

In accordance with this invention, the film can be instantly cured and industrially useful coated or covered articles with the sufficiently cured film having excellent hardness and flexibility can be obtained.

The method for curing the film of the resin by ionizing radiation is particularly suitable for coil coating or coating of woodworks. In this case, electron ray energy is effectively and efficiently used. Furthermore, the curing of the film can be achieved in from several seconds to several minutes, and in the case when an electron accelerator having a large capacity is particularly employed, it is possible to cure within one second. Accordingly, the method according to this invention is industrially very useful with respect to reduction of floor area for working and high-speed coating lines.

For the conjugated unsaturated fatty acids or the conjugated unsaturated oils employed in the preparation of the alkyd resin according to this invention, there are, for example, tung oil, tung oil fatty acid, oiticica oil, oiticica oil fatty acid, dehydrated castor oil, dehydrated castor oil fatty acid, conjugated safflower oil, conjugated safflower oil fatty acid, and highly conjugated linolic acid.

These fatty acids and oils are used alone or as a suitable mixture. Moreover, it is desirable that the alkyd resin modified by these fatty acids or oils has from 10 to 50% of oil length. When using the fatty acid or oil having conjugated double bonds for preparing the alkyd resin of this invention, the hardness of the obtained alkyd resin film by curing in air is sufficient in the surface of the coated film, and since the double bonds in the fatty acid or oil are polymerizable with vinyl monomer, the cured film has excellent hardness. If the fatty acid or oil having non-conjugated double bonds is used as a modifier, the cured film having above mentioned excellent properties cannot be obtained, and, the curing rate is retarded as compared with the alkyd resin of this invention.

For the alcohol components employed in the alkyd resin of this invention, there are, for example, ethylene glycol, diethylene glycol, propylene glycol, 1,6-hexanediol, 1,3-butylene glycol, trimethylolethane, trimethylolpropane, pentaerythritol, and neopentyl glycol.

For the acid components employed in the alkyd resin of this invention, there are, for example, phthalic anhydride, hexahydrophthalic anhydride, trimellitic anhydride, terephthalic acid, isophthalic acid, adipic acid, succinic acid, fatty acids of linseed oil, and fatty acids of soybean oil.

As acid anhydrides having polymerizable unsaturated group and employed in the half-esterification reaction of this invention, there are, for example, maleic anhydride, citraconic anhydride, itaconic anhydride, tetrahydrophthalic anhydride, endo-cis-bicyclo-(2,2,1)-5-heptene-2, 3-dicarboxylic anhydride, and 1,4,5,6,7,7-hexachlorobicyclo-(2,2,1)-5-heptene-2,3-dicarboxylic anhydride.

As for the polymerizable vinyl monomers for dissolving the alkyd resin half-esterified by the acid anhydride having polymerizable unsaturated group, there are, for example, acrylic esters such as methyl acrylate, ethyl acrylate, 2-ethyl hexyl acrylate, iso-butyl acrylate and n-butyl acrylate, methacrylic esters such as methyl methacrylate, ethyl methacrylate, lauroyl methacrylate and n-butyl methacrylate, vinyl monomers of aromatic hydrocarbons such as styrene, and vinyl toluene, and vinyl monomers having various functional groups such acrylonitrile, acrylic amide, acrylic acid, methacrylic acid, β-hydroxypropyl methacrylate and β-hydroxyethyl methacrylate, and vinyl acetate and these vinyl monomers may be used alone or as a suitable mixture.

Less than 10% of a non-polymerizable organic solvent may be employed instead of the vinyl monomers mentioned above.

Next, the process for preparing the resin composition according to the present invention will be described.

Into a reactor provided with a thermometer, stirrer, pipe for introducing gas, and water separator, the conjugated unsaturated fatty acid and/or conjugated unsaturated oil, polyhydric alcohol (hereinafter referred to simply as "alcohol component") being generally a raw material of alkyd resin, and monobasic or polybasic acid or their anhydrides (hereinafter referred to simply as "acid component") are charged. The resulting mixture is subjected to water extracting condensation in accordance with a known process to synthesize an alkyd resin. In the case of preparing the alkyd resin having more than 40% of oil length, a alcohol as a portion of alcohol component may be employed.

It is easy to impart hydroxyl groups in the alkyd resin by using an excess of a quantity of hydroxyl groups of alcohol component with respect to acid groups of acid component at the time of initially blending the components. In this case, the ratio of alcohol component to acid component differs in accordance with the degree of polymerizable unsaturated groups to be introduced in the alkyd resin. In general, it is necessary to have at least one hydroxyl group per one molecule of the alkyd resin in order to obtain a sufficient density of cross linkage. It is preferable that the alkyd resin has from 300 to 2000 of hydroxyl equivalent, and at least 30% of the hydroxyl groups in the alkyd resin must be reacted with an acid anhydride having a polymerizable unsaturated group in order to obtain the half-esterified alkyd resin polymerizable with the vinyl monomer.

The half-esterification reaction is carried out by charging an acid anhydride having polymerizable unsaturated group to the alkyd resin synthesized as mentioned above in accordance with a known process. Generally, the half-esterification reaction of the hydroxyl groups of the alkyd resin and acid anhydride can be completed at a reaction temperature of about 100°C in about 1 hour, and there is no fear of gelation under such a reaction condition. Accordingly, polymerizable unsaturated groups can be easily introduced into the alkyd resin. If circumstances require, a fear of gelation of the resin at the time of half-esterification can be completely eliminated by adding a very small amount of a polymerization inhibitor such as hydroquinone and tertiary butylcatechol at the time of the half-esterification reaction.

After the completion of the half-esterification reaction, a vinyl monomer is added to the half-esterified alkyd resin to dissolve it and by this operation, the alkyd resin having polymerizable unsaturated groups and dissolved in a vinyl monomer can be prepared. When the half-esterified alkyd resin is heated to a comparatively high temperature, its dissolving into vinyl monomer becomes easier, further, the alkyd resin compositions having polymerizable unsaturated groups obtained by dissolving the resin into the vinyl monomer is stable, and a long period of storage of the alkyd resin becomes possible.

The alkyd resin compositions according to this invention are useful for coating materials, and provide excellent hardness and flexibility.

In a coated film of the alkyd resin according to this invention, the density of cross-linkage thereof is high and further, since a vinyl component is introduced thereinto, the hardness of the film is remarkable and stiff so that the film of the alkyd resin according to this invention is excellent in chemical resistance and weathering resistance. As a result, the film properties of the alkyd resin are elevated and it is widely applicable for various uses such as primer surfaces for metal, finish coating for metal, coating material for wood or paper, and indoor or outdoor coating material.

For the ionizing radioactive rays utilized in this invention, there are, for example, proton rays, alpha-rays, beta-rays, gamma-rays, accelerated electron rays, and X-rays and particularly, accelerated electron rays, beta-rays, and gamma-rays are desirable. For the radiation sources of these radioactive rays, there are, for example, various electron accelerators, strontium-90, and cobalt-60, respectively. The ionizing radiation is applied in a total radiation dose of from 0.1 to 50 M rad, preferably from 0.5 to 10 M rad.

Although the temperature in the ionizing radiation according to this invention is not especially limited, a temperature ranging from 50° to 5°C is practically desirable. Radiation time is different in accordance with the intensities of radiation sources to be employed. Generally it is within a range of from several seconds to several minutes, and particularly in the case of employing an accelerator of a large capacity, the coated film of the alkyd resin according to this invention is cured by the ionizing radiation within one second. Accordingly the method of this invention is suitably applied for a high speed continuous coating process. Rate of radiation dose and radiation dose are easily changeable in accordance with radiation conditions. As of radiation methods, a transferring method such as the conveyor transferring method and the coil coating method may be employed in the present invention as occasion demands, whereby a uniform radiation can be carried out.

In order to indicate still more clearly the nature and utility of the invention, the following specific examples of practice constituting preferred embodiments of the invention and results are set forth, it being understood that these examples are presented as illustrative only, and that they are not intended to limit the scope of the invention.

Furthermore, it is to be noted that "parts" and "%" in these examples mean "part by weight" and "% by weight", respectively.

EXAMPLE 1

Into a reactor provided with a thermometer, stirrer, pipe for introducing inert gas, and water separator, 384 parts of phthalic anhydride, 115 parts of pentaerythritol, 233 parts of trimethylolethane, 288 parts of tung oil fatty acids, 49 parts of p-tertiary butyl benzoic acid, and 60 parts of xylene (mixed xylene consisting of 30% of o-xylene, 30% of m-xylene, and 40% of p-xylene) as azeotropic solvent were charged. Nitrogen gas was introduced into the resulting mixture, the temperature of the contents in the reactor was elevated to 200°C while stirring, and the reaction was continued for about 10 hrs. at this temperature thereby to condensate the resin thus obtained to an acid value of 12 (Oil length being 28.8% and hydroxyl value about 155). Thereafter, the temperature of the contents was decreased to 110°C, 271 parts of maleic anhydride and 0.6 part of hydroquinone were added thereto, and the stirring was continued for 1 hr. at 110°C thereby to complete the reaction.

By this reaction operation, an alkyd resin modified by a conjugated unsaturated fatty acid and obtained by reacting free hydroxyl groups with acid anhydride having polymerizable unsaturated group was obtained.

Immediately after the half-esterification reaction, 500 parts of styrene was added to 500 parts of the resulting alkyd resin, nitrogen gas was introduced thereinto, and the resulting mixture was sufficiently stirred to dissolve the resin while heating the mixture at a temperature of 80°C. After dissolving the mixture, it was cooled to a room temperature and as a result, a styrene monomer solution having a resin content of 50% was prepared.

A coating material prepared by well blending 1.0 part of 60% toluene solution of cobalt naphthenate with 100 parts of the above described alkyd resin composition was coated on one side of a glass plate having a thickness of 1.5 mm so as to obtain a film having a thickness of 20 microns.

The glass plate thus coated was placed on a conveyor device for electron ray radiation and was subjected to a total radiation dose of 5 M rad by employing a transformer type electron accelerator under such condition of acceleration energy being 300 kV. and electron rays current 25 mA., respectively. The radiation time was about one second.

The results of pencil scratch hardness and gelation percentage obtained by measuring the cured film are indicated in Table 1. For the comparison, another coating material prepared by blending 2.0 parts of 50% diethyl fumarate solution of methyl ethyl ketone peroxide and 1.0 part of 60% toluene solution of cobalt naphthenate with 100 parts of the above alkyd resin composition was coated on two glass plates so as to obtain a film having a thickness of 20 microns. One plate was baked in a hot blast stove at a temperature of 100°C for 5 min. and the other was left in a thermostatic chamber at a temperature of 25°C for 8 hrs. The measured results of thus prepared films are similarly indicated in Table 1.

Table 1

| Test Items | Curing Condition Curing at 25°C for 8 hrs. | Baking at 100°C for 5 min. | Radiation by 5 M rad |
|---|---|---|---|
| Pencil Scratch Hardness *1 | B | HB | F - H |
| Gelation Percentage *2 | 68.1 | 70.8 | 78.3 |

*1: Pencil scratch hardness according to JIS K 5652 (5.15) (1957).
*2: Each sample film was peeled off from the glass plate, the film was placed in a wire gauze of stainless steel of 300 mesh, and extracted in Soxhlet extractor by the use of acetone solvent for 20 hrs. Then, the resulting extract was dried at a temperature of 110°C for 3 hrs. The thus dried extract was weighed, and the gelation percentage was calculated in accordance with the following equation:
Gelation Percentage (%) = (Weight of Residue / Weight of Sample ) × 100

In accordance with the value of gelation percentage, the degree of cross linkage can be relatively estimated.

EXAMPLE 2

Into the same reactor as in Example 1, 377 parts of phthalic anhydride, 69 parts of pentaerythritol, 241 parts of trimethylolethane, 343 parts of highly conjugated linolic acid (Trade name "Hidiene" manufactured by Soken Kagaku K.K.; neutralization value being 200 and iodine number 175), 44 parts of p-tertiary butyl benzoic acid, and 50 parts of xylene (same as in Example 1) as azeotropic solvent were charged. Nitrogen gas was introduced into the resulting mixture, the temperature of the contents in the reactor was elevated to 180°C while stirring, and the reaction was continued for 1 hr. at this temperature. Then, the temperature of the contents was further elevated to 220°C, and the reaction was continued for about 5 hrs. at this temperature thereby to condensate the resin thus obtained to an acid value of 13 (Oil length being 34.3% and hydroxyl value about 84). Thereafter, the temperature of the contents was decreased to 110°C, 146 parts of maleic anhydride and 0.5 part of hydroquinone were added thereto, and the stirring was continued for one hr. at 110°C thereby to complete the reaction.

By this reaction operation, an alkyd resin modified by a conjugated unsaturated fatty acid as a component and obtained by reacting free hydroxyl groups with acid anhydride having polymerizable unsaturated group was obtained.

Immediately after the half-esterification reaction, 600 parts of styrene was added to 400 parts of thus half-esterified alkyd resin, nitrogen gas was introduced thereinto, and the resulting mixture was sufficiently stirred to dissolve the resin while heating the mixture at a temperature of 80°C. After dissolving, the mixture was cooled to room temperature and as a result, a styrene monomer solution having a resin content of 40% was prepared.

1.5 part of 60% toluene solution of cobalt octenate was added to 100 parts of the above described alkyd resin composition and sufficiently blended. Further, 50 parts of rutile type titanium white was added thereto and dispersed by the use of a quick mill thereby to prepare a white enamel. The white enamel thus prepared was coated on one side of a surface-treated galvanized sheet iron having a thickness of 0.27 mm so as to obtain a film having a thickness of 15 microns. The galvanized sheet iron thus coated was subjected to a by total radiation dose of 4 M rad by employing the same electron accelerator and under the same condition as in Example 1 to cure the coated film.

The results of pencil scratch hardness, impact test, and adhesion test regarding the resulting cured film are indicated in Table 2. For comparison, another coating material was prepared by blending well 2.0 parts of 50% diethyl fumarate solution of methyl ethyl ketone peroxide and 1.0 part of 60% toluene solution of cobalt naphthenate with the above described white enamel, and the thus obtained coating material was coated on a similar galvanized sheet iron as described above so as to obtain a film having a thickness of 15 microns. The and thus coated sheet iron was left as it was in a thermostatic chamber at a temperature of 25°C for 10 hrs.

Table 2

| Curing Condition<br>Test Items | Curing at 25°C for 10 hrs. | Radiation by 4 M rad |
| --- | --- | --- |
| Pencil Scratch Hardness *1 | B | H |
| Impact Test *2 | Good | Good |
| Adhesion Test *3 | Good | Good |
| Solvent Resistance *4 | 30 times | 92 times |

*1: Same as in *1 of Example 1.
*2: Cracks and peelings of a coated film in the case when a load of 1 kg was dropped from a height of 50 cm, ½" by employing du Pont impact tester were examined.
*3: A coated film was cut into 100 squares, each area of them being 1 mm × 1 mm, with a knife in such a degree that each cutting just reached the base material. Scotch tape was adhered closely the so cut film, and peeled off in a direction of 180°.
*4: A gauze steeped in xylene was contacted with the surface of the coated film and an even force was applied thereon to rub the surface of the film until the base material was exposed, and the required number of times for its reciprocating motion was counted.

EXAMPLE 3

Into the same reactor as in Example 1, 338 parts of phthalic anhydride, 128 parts of pentaerythritol, 167 parts of trimethylolethane, 384 parts of isomerized linseed oil fatty acid (conjugated acid content being 30.0%, neutralization value 201, and iodine number 135, respectively), 53 parts of p-tertiary butyl benzoic acid, and 50 parts of xylene (same in Example 1) as azeotropic solvent were charged. Nitrogen gas was introduced into the resulting mixture, the temperature of the contents of the reactor was elevated to 225°C while stirring, and the reaction was continued for about 5.5 hrs. at this temperature thereby to condensate the resin thus obtained to an acid value of 10 (Oil length being 38.4%, and hydroxyl value about 96, respectively). Thereafter, the temperature of the contents was decreased to 110°C, 192 parts of citraconic anhydride and 0.6 part of hydroquinone were added thereto, and the stirring was continued for 1 hr. at 110°C thereby to complete the reaction.

By this reaction operation, an alkyd resin modified a conjugated unsaturated fatty acid as a component and obtained by reacting free hydroxyl groups with acid anhydride having polymerizable unsaturated group was obtained.

Immediately after the half-esterification reaction, a mixture consisting of 300 parts of styrene and 200 parts of ethyl acrylate was added to 500 parts of the half-esterified alkyd resin, nitrogen gas was introduced thereinto, and the resulting mixture was sufficiently stirred to dissolve the resin while heating the mixture at a temperature of 80°C. After dissolving, the mixture was cooled to room temperature and as a result, a vinyl monomer solution having a resin content of 50% was prepared.

A coating material prepared by well blending 1.0 part of 60% toluene solution of cobalt naphthenate with 100 parts of the above described alkyd resin composition was coated on one side of a glass plate having a thickness of 1.5 mm so as to obtain a film having a thickness of 30 microns.

The glass plate thus coated was subjected to a total radiation dose of 6 M rad by employing the same electron accelerator and under the same conditions as in Example 1 to cure the coated film.

The results of pencil scratch hardness and gelation percentage obtained by measuring the cured film are indicated in Table 3. For the comparison, another coating material, prepared by blending 2.0 parts of 50% diethyl fumarate solution of methyl ethyl ketone peroxide and 1.0 part of 60% toluene solution of cobalt naphthenate with 100 parts of the above alkyd resin composition, was similarly coated on the glass plate as described above. In this manner, films coated on two glass plates were prepared, one of which was baked in a hot blast stove at a temperature of 100°C for 5 min. and another which was left in a thermostatic chamber as it was at a temperature of 25°C for 8 hrs. The measured results of thus prepared films were similarly indicated in Table 3.

Table 3

| Curing Condition<br>Test Items | Curing at 25°C for 8 hrs. | Baking at 100°C for 5 min. | Radiation by 6 M rad |
| --- | --- | --- | --- |
| Pencil Scratch Hardness *1 | B - 2B | B - HB | H |
| Gelation Percentage *2 | 63.2 | 68.7 | 76.4 |

*1: Same as in *1 of Example 1.
*2: Same as in *2 of Example 1.

EXAMPLE 4

Into the same reactor as in Example 1, 508 parts of dehydrated castor oil (Conjugated acid content being 28%, iodine number 140, and acid value 1.3, respectively), 145 parts of pentaerythritol, and 42 parts of glycerine were placed, then nitrogen gas was introduced into the resulting mixture, and the temperature of the contents of the reactor was elevated to 200°C while stirring. When the temperature of the contents reached to 200°C, 0.5 part of litharge was added to said contents, the temperature was elevated to 235°C, and the reaction was continued at this temperature for 30 min. Then, after lowering the temperature of the contents to 200°C, 300 parts of phthalic anhydride, 48 parts of p-tertiary butyl benzoic acid, and 50 parts of xylene (same as in Example 1) as azeotropic solvent were further added to said contents, the temperature thereof was again elevated to 230°C, and the reaction was continued at this temperature for about 4.5 hrs. thereby to condense the resin thus obtained to an acid value of 6 (Oil length being 48.6%, and hydroxyl value about 72, respectively). Thereafter, the temperature of the contents was lowered to 110°C, 125 parts of maleic anhydride and 0.6 part of hydroquinone were added to the resin, and the stirring was continued for 1 hr. at 110°C thereby to complete the reaction.

By this reaction operation, an alkyd resin modified a conjugated unsaturated fatty acid as a component and obtained by reacting free hydroxyl groups with acid anhydride having polymerizable unsaturated group was obtained.

Immediately after the half-esterification reaction, a mixture consisting of 250 parts of styrene and 250 parts of methyl methacrylate was added to 500 parts of thus half-esterified alkyd resin, nitrogen gas was introduced thereinto, and the resulting mixture was sufficiently stirred to dissolve the resin while heating the mixture at a temperature of 80°C. After dissolving, the mixture was cooled to a room temperature and as a result, a vinyl monomer solution having a resin content of 50% was prepared.

A coating material prepared by well blending 1.0 part of 60% toluene solution of cobalt naphthenate with 100 parts of the above described alkyd resin composition was coated on one side of a glass plate having a thickness of 1.5 mm so as to obtain a film having a thickness of 20 microns.

The glass plate thus coated was subjected to gamma-ray radiation due to cobalt 60 by total radiation dose of 1 M rad at a rate of radiation dose of $1 \times 10^6$ roentgen/hr. at a room temperature for one hr. to cure the coated film.

The results of pencil scratch hardness and gelation percentage obtained by measuring the film cured by gamma-ray radiation are shown in Table 4. For comparison, another coating material, prepared by blending 2.0 parts of 50% diethyl fumarate solution of methyl ethyl ketone peroxide and 1.0 part of 60% toluene solution of cobalt naphthenate with 100 parts of the above alkyd resin composition, was similarly coated on the glass plate as described above. The glass plate thus coated was left in a thermostatic chamber as it was at a temperature of 25°C for 8 hrs. and the measured results of thus treated film are similarly indicated in Table 4.

Table 4

| Test Items | Curing Condition<br>Curing at 25°C<br>for 8 hrs. | Radiation<br>by 1 M rad |
|---|---|---|
| Pencil Scratch Hardness *1 | 2B - B | B - HB |
| Gelation Percentage *2 | 60.7 | 68.3 |

*1: Same as in *1 of Example 1.
*2: Same as in *2 of Example 1.

As shown in the above examples, the alkyd resin composition according to this invention was coated on an article and when thus coated film was subjected to radiation of, for example, electron rays, the curing property of the film was excellent.

What is claimed is:

1. A method for curing alkyd resin compositions which comprises applying ionizing radiation in a total radiation dose of from 0.1 to 50 M rad to an alkyd resin composition comprising
   a. styrene; and
   b. an alkyd resin product consisting essentially of the half-esterification product of (1) a conjugated unsaturated fatty acid or conjugated unsaturated fatty oil, selected from the group consisting of tung oil, linseed oil, linolic and dehydrated castor oil, modified alkyd resin, said alkyd resin of ingredients comprising phthalic anhydride, pentaerythritol, and trimethylol ethane or glycerine having an oil length of from 10 to 50 percent and a hydroxyl equivalent of 300–2000, and (2) maleic anhydride or citraconic anhydride, said anhydride being in an amount sufficient to react with at least 30 percent of the hydroxyl groups of said modified alkyd resin.

2. A method for curing alkyd resin compositions according to claim 1, in which said ionizing radiation is carried out by a member selected from the group consisting of proton rays, alpha-rays, beta-rays, gamma-rays, accelerated electron rays, and X-rays.

3. A method for curing alkyd resin compositions according to claim 1, in which said ionizing radiation is applied in a total radiation dose of from 0.5 to 10.0 M rad.

4. The method of claim 1 wherein the alkyd resin is of ingredients consisting of phthalic anhydride, pentaerythritol, trimethylol ethane, and tung oil fatty acid, and the acid anhydride is maleic anhydride.

5. The method of claim 1 wherein the alkyd resin is of ingredients consisting of phthalic anhydride, pentaerythritol, trimethylol ethane, and isomerized linseed oil fatty acid, and the acid anhydride is citraconic anhydride.

6. The method of claim 1 wherein the alkyd resin is of ingredients consisting of dehydrated castor oil, pentaerythritol, glycerine and phthalic anhydride, and the acid anhydride is maleic anhydride.

7. The method of claim 1 wherein said ionizing radiation is applied at a temperature of 5°–50° C.

* * * * *